(12) United States Patent
Shito et al.

(10) Patent No.: US 8,328,913 B2
(45) Date of Patent: Dec. 11, 2012

(54) FLAMMABLE GAS CONCENTRATION SYSTEM

(75) Inventors: Etsuo Shito, Matsubara (JP); Katsuhiko Hirao, Nara (JP); Kenji Seki, Higashiosaka (JP)

(73) Assignee: Osaka Gas Co., Ltd., Osaka (JP)

( * ) Notice: Subject to any disclaimer, the term of this patent is extended or adjusted under 35 U.S.C. 154(b) by 707 days.

(21) Appl. No.: 12/446,830

(22) PCT Filed: Oct. 11, 2007

(86) PCT No.: PCT/JP2007/069866
§ 371 (c)(1),
(2), (4) Date: Nov. 4, 2009

(87) PCT Pub. No.: WO2008/053681
PCT Pub. Date: May 8, 2008

(65) Prior Publication Data
US 2010/0115840 A1   May 13, 2010

(30) Foreign Application Priority Data

Oct. 31, 2006   (JP) .................................. 2006-296619
Jun. 21, 2007   (JP) .................................. 2007-164017

(51) Int. Cl.
   *B01D 53/02*   (2006.01)
(52) U.S. Cl. ................ 96/108; 96/109; 96/111; 96/115; 96/121; 96/130
(58) Field of Classification Search ............... 95/95–98, 95/104, 105, 143, 148; 96/108, 109, 111, 96/115, 121, 130
See application file for complete search history.

(56) References Cited

U.S. PATENT DOCUMENTS

| 4,305,734 A | * | 12/1981 | McGill | .......................... 95/102 |
| 2010/0005958 A1 | * | 1/2010 | Seki et al. | .......................... 95/26 |

FOREIGN PATENT DOCUMENTS

| CN | 85103557 A | 10/1986 |
| JP | 58198591 A | 11/1983 |
| JP | 60262890 A | 12/1985 |
| JP | 61136419 A | 6/1986 |
| JP | 63065929 A | 3/1988 |
| JP | 03290301 A | 12/1991 |
| JP | 11267439 A | 10/1999 |
| WO | 0228714 A1 | 4/2002 |

* cited by examiner

*Primary Examiner* — Duane Smith
*Assistant Examiner* — Christopher P Jones
(74) *Attorney, Agent, or Firm* — The Webb Law Firm

(57) ABSTRACT

A flammable gas concentration system is described, which includes a concentrating apparatus for acquiring at least a portion of the product gas, concentrating the flammable gas included in the acquired product gas, and generating a high-concentration gas; and a mixer for acquiring the raw gas and the high-concentration gas generated by the concentrating apparatus, mixing the acquired high-concentration gas and the raw gas, and generating the product gas.

11 Claims, 2 Drawing Sheets

(a)

(b)

FLAMMABLE GAS CONCENTRATION SYSTEM

TECHNICAL FIELD

The present invention relates to a flammable gas concentration system for generating a product gas in which the flammable gas from a raw gas containing methane or another flammable gas is concentrated.

BACKGROUND ART

Just as air components (primarily nitrogen, oxygen, and carbon dioxide) are included in addition to the flammable gas methane that is included in coal mine gas obtained from a coal mine, for example, flammable gases that exist in nature are often obtained as a raw gas that includes air components in addition to the flammable gas. In order to effectively utilize such a raw gas as a fuel, the air components included in the raw gas must be removed, and the flammable gas included in the raw gas must be concentrated.

An adsorption-type concentration device that uses an adsorbent composed of natural zeolite to selectively adsorb air components in relation to methane is known as a concentration device for removing air components from the coal mine gas and concentrating the methane (see Patent Document 1, for example).

The adsorption-type concentration device disclosed in Patent Document 1 is provided with an adsorption tower filled with an adsorbent for selectively adsorbing air components other than a flammable gas, and is configured so as to alternately execute adsorption processing for injecting coal mine gas or another raw gas at a relatively high pressure into the adsorption tower and causing the air components included in the coal mine gas to be selectively adsorbed to the adsorbent; and desorption processing for reducing the pressure inside the adsorption tower below atmospheric pressure and driving out concentrated gas that includes a large amount of the flammable gas that was not adsorbed to the adsorbent or was selectively desorbed from the adsorbent.

[Patent Document 1] Japanese Laid-open Patent Application No. 58-198591

DISCLOSURE OF THE INVENTION

Adequate care must generally be taken in handling a gas when the flammable gas concentration is within an explosive concentration range of about 5 wt % or above and about 15 wt % or below, for example.

In a raw gas such as coal mine gas or the like that includes a flammable gas along with air components, there is risk of the flammable gas concentration being within or near the explosive concentration range, and it is highly dangerous to concentrate such a raw gas in a concentration device in order to utilize the gas.

There is also a significant possibility of the flammable gas concentration approaching or entering the explosive concentration range even in the process of concentrating a raw gas in which the flammable gas concentration is less than about 5 wt %.

For a gas in which the flammable gas concentration is within a low concentration range of less than 30 wt %, for example, the risk of the flammable gas concentration being within or near the explosive concentration range is generally high, and the gas is preferably not directly utilized, transported, or stored. It is also naturally preferred that such a gas not be used in a concentration device or other gas utilizing equipment. In the past, gas in which the flammable gas concentration was within a low concentration range was discharged into the atmosphere and thus discarded after the concentration of the flammable gas thereof was reduced to 1.5 wt % or lower using a ventilation device or the like, for example. When a gas in which the flammable gas concentration is within a low concentration range is released into the atmosphere, a flashback prevention device or other equipment must be provided for preventing flames from propagating upstream when ignition/explosion occurs for any reason, and problems occur in that the flammable gas cannot be utilized, and the equipment cost also increases.

The present invention was developed in view of the problems described above, and an object of the present invention is to provide a flammable gas concentration system capable of safely generating a product gas that can be effectively utilized as a fuel in which the flammable gas is concentrated, even from a gas in which the flammable gas concentration is within a low concentration range of less than 30 wt %, for example.

The flammable gas concentration system according to the present invention for achieving the abovementioned objects is a flammable gas concentration system for generating a product gas in which a flammable gas is concentrated from a raw gas that includes the flammable gas; and the flammable gas concentration system comprises concentrating means for acquiring at least a portion of the product gas, concentrating the flammable gas included in the acquired product gas, and generating a high-concentration gas; and mixing means for acquiring the raw gas and the high-concentration gas generated by the concentrating means, mixing the acquired high-concentration gas and the raw gas, and generating the product gas.

According to the aspect described above, a portion of a product gas that includes a flammable gas in a relatively high concentration range (about 40 wt %, for example) is concentrated by the concentrating means, and a high-concentration gas can be generated that includes the flammable gas in an even higher concentration range (about 60 wt %, for example) than the product gas.

The high-concentration gas generated by the concentrating means is mixed by the mixing means with raw gas in which the flammable gas concentration is within a low concentration range of less than 30 wt %, for example, whereby a product gas can be obtained in which the flammable gas concentration is within a higher range (about 40 wt %, for example) than the raw gas in which the flammable gas concentration is lower than in the high-concentration gas.

Consequently, the flammable gas concentration system according to the present invention makes it possible to safely generate a product gas that can be effectively utilized as a fuel in which the flammable gas is concentrated, without feeding a raw gas in which the flammable gas concentration is within a low concentration range of less than 30 wt %, for example, directly to the abovementioned concentrating means or other gas utilizing equipment in the concentration process.

In another aspect of the flammable gas concentration system of the present invention, the concentrating means comprises an adsorption tower filled by an adsorbent for selectively adsorbing the flammable gas, and is configured so as to alternately execute adsorption processing for causing the product gas to pass through an inside of the adsorption tower, and desorption processing for expelling the high-concentration gas from the inside of the adsorption tower at a pressure lower than a pressure during the adsorption processing.

According to the aspect described above, when the adsorption processing is executed, the flammable gas included in the flowing product gas is adsorbed to the adsorbent inside the adsorption tower at about atmospheric pressure, for example, and the remaining exhaust gas is discharge to the outside. It is possible for a small amount of the flammable gas not adsorbed to the adsorbent to remain in the exhaust gas that is discharged to the outside from within the adsorption tower, but because the concentration thereof is below the explosive concentration range, processing can be safely performed.

When the desorption processing is then executed after the adsorption processing, the flammable gas is desorbed from the adsorbent by drawing in gas in the adsorption tower in which the pressure is reduced lower than a pressure during the adsorption processing, and the gas that includes the flammable gas is expelled as the high-concentration gas. Since the high-concentration gas expelled from the adsorption tower includes a large quantity of the flammable gas desorbed from the adsorbent, the concentration thereof is higher than the explosive concentration range, and processing can be safely performed.

In such a concentrating means, when the flammable gas concentration in the gas fed into the adsorption tower in the adsorption processing, for example, is less than about 5%, for example, the flammable gas is not easily adsorbed to the adsorbent, and it is possible for the flammable gas concentration of the high-concentration gas obtained after concentration to be within or near the explosive concentration range. However, in the flammable gas concentration system of the present invention, since a product gas in which the flammable gas is at a relatively high concentration is fed to the concentrating means, as much as possible of the flammable gas can be adsorbed to the adsorbent, and the flammable gas concentration of the high-concentration gas obtained after concentration can be set adequately high with respect to the explosive concentration range.

Since there is no compression of the product gas, the exhaust gas, or the high-concentration gas in such a concentrating means, the danger of gas explosion can be even further reduced, and there is also no energy consumed for compression.

In another aspect of the flammable gas concentration system of the present invention, the flammable gas is methane.

According to the aspect described above, a methane concentration system can be provided for safely generating a product gas in which methane is concentrated from coal mine gas or another raw gas that includes methane as the flammable gas.

In another aspect of the flammable gas concentration system of the present invention, a storage unit is provided for storing the product gas, and the concentrating means is configured so as to acquire the product gas from the storage unit.

According to the aspect described above, since the product gas can always be stored in the storage unit, even in a state in which a product gas has not yet been generated by the mixing means, such as immediately after the start of operation, the product gas already stored in the storage unit can be concentrated by the concentrating means to generate high-concentration gas, and the high-concentration gas can be mixed with raw gas in the mixing means to begin generating product gas.

Another aspect of the flammable gas concentration system of the present invention comprises suction means for drawing in the product gas from the mixing means, the suction means being provided on a downstream side of the mixing means.

According to the aspect described above, the suction means is provided on the downstream side of the mixing means, whereby the raw gas and the high-concentration gas can both be fed to the mixing means by the suction force of the suction means, and there is no need to provide a separate pump for feeding the gases.

Another aspect of the flammable gas concentration system of the present invention comprises concentration setting means for adjusting a feeding rate of the high-concentration gas to the mixing means and setting a flammable gas concentration of the product gas generated by the mixing means to or above an allowed concentration.

According to the aspect described above, even when the feeding rate or flammable gas concentration varies in the raw gas fed to the mixing means, the feeding rate of the high-concentration gas to the mixing means can be adjusted, and the flammable gas concentration of the product gas can be maintained at or above an allowed concentration (30 wt % or higher, for example).

BEST MODE FOR CARRYING OUT THE INVENTION

Embodiments of the flammable gas concentration system according to the present invention will be described based on the drawings.

Figure 1:
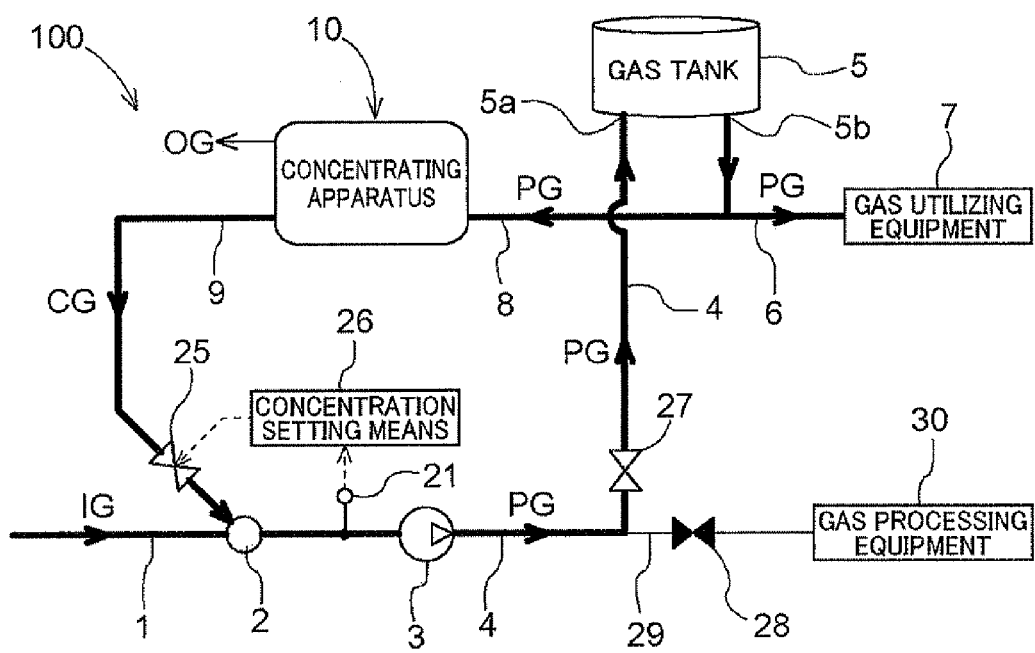
FIG. 1 is a schematic structural diagram showing the flammable gas concentration system.

The flammable gas concentration system 100 shown in FIG. 1 is configured as a methane concentration system for generating a product gas PG in which methane is concentrated from coal mine gas or another raw gas IG that includes methane as a flammable gas.

The methane concentration system is composed of a concentrating apparatus 10 (an example of the concentrating means) for acquiring at least a portion of the product gas PG via a duct 8, concentrating the methane included in the acquired product gas PG, and generating high-concentration gas CG; and a mixer 2 (an example of the mixing means) for acquiring via a duct 9 the high-concentration gas CG generated by the concentrating apparatus 10, acquiring the raw gas IG via a duct 1, mixing the acquired high-concentration gas CG and raw gas IG, and generating the product gas PG.

A gas tank 5 (an example of the storage unit) for storing the product gas PG is furthermore provided, and is configured so that the concentrating apparatus 10 acquires the product gas PG via the duct 8 from a discharge part 5b of the gas tank 5.

The product gas PG generated by the mixer 2 thus flows into, and is temporarily stored in, the gas tank 5 from an inflow part 5a via a suction pump 3 and a duct 4 described hereinafter, the stored product gas PG is discharged from the discharge part 5b as needed, and is fed to the concentrating apparatus 10 via the duct 8 as described above, or fed via a duct 6 to a gas engine, a boiler, or other gas utilizing equipment 7 that consumes the product gas PG.

A suction pump 3 (an example of the suction means) for drawing in the product gas PG from the mixer 2 side is provided to the duct 4 on the downstream side of the mixer 2.

Since the raw gas IG is fed from the duct 1 to the mixer 2, and the high-concentration gas CG is also fed from the duct 9 by the suction force of the suction pump 3, there are not individual pumps for feeding these gases.

In the methane concentration system thus configured, even when the methane concentration in the raw gas IG is less than an allowed concentration that is set somewhat higher (30 wt %, for example) than the upper limit of the explosive concentration range, for example, the methane concentration can be prevented from entering or approaching the explosive concentration range in the concentration process for obtaining the product gas PG in which methane is concentrated from the raw gas IG, and a product gas PG can safely be obtained that can be effectively utilized as a fuel.

For example, supposing a case of concentrating a raw gas IG in which the methane concentration is 20 wt % and the flow rate is 30 m$^3$/min, and obtaining a product gas PG having a methane concentration of 40 wt %, the methane concentration and flow rate of each type of gas that occur in the concentration process, i.e., the methane concentration and flow rate of the raw gas IG in the duct 1, the product gas PG in the duct 4, the product gas PG in the duct 8, the high-concentration gas CG in the duct 9, and the product gas PG in the duct 6, may be as shown in Tables 1 and 2 below.

Table 1 shows the results calculated for an example (Example 1) in which the concentrating apparatus 10 is capable of concentrating a product gas PG having a methane concentration of 40 wt % at a flow rate of 45 m$^3$/min, and obtaining a high-concentration gas CG having a methane concentration of 60 wt % at a flow rate of 30 m$^3$/min, and Table 2 shows the results calculated for an example (Example 2) in which the concentrating apparatus 10 is capable of concentrating a product gas PG having a methane concentration of 30 wt % at a flow rate of 20 m$^3$/min, and obtaining a high-concentration gas CG having a methane concentration of 60 wt % at a flow rate of 10 m$^3$/min.

TABLE 1

| Flow site | Gas name | Methane concentration (wt %) | Flow rate (m$^3$/min) |
|---|---|---|---|
| Duct (1) | Raw gas (IG) | 20 | 30 |
| Duct (4) | Product gas (PG) | 40 | 60 |
| Duct (8) | Product gas (PG) | 40 | 45 |
| Duct (9) | High-concentration gas (CG) | 60 | 30 |
| Duct (6) | Product gas (PG) | 40 | 15 |

TABLE 2

| Flow site | Gas name | Methane concentration (wt %) | Flow rate (m$^3$/min) |
|---|---|---|---|
| Duct (1) | Raw gas (IG) | 20 | 30 |
| Duct (4) | Product gas (PG) | 30 | 40 |
| Duct (8) | Product gas (PG) | 30 | 20 |
| Duct (9) | High-concentration gas (CG) | 60 | 10 |
| Duct (6) | Product gas (PG) | 30 | 20 |

In other words, it is apparent that in both Examples 1 and 2, even when the methane concentration of the raw gas IG is 20 wt %, which is less than the allowed concentration (30 wt %), the raw gas IG is not fed directly to the concentrating apparatus 10, and the concentrations of methane in the high-concentration gas CG and the product gas PG generated in the concentration process are always maintained at or above the allowed concentration, and do not enter or approach the explosive concentration range.

Even when a raw gas having a methane concentration of 20 wt % at a flow rate of 30 m$^3$/min is fed directly to the concentrating apparatus and concentrated (processing a gas having a methane concentration of less than 30 wt % in a concentrating apparatus or the like is generally not considered safe, and the gas cannot be processed), it is supposed that the gas can be concentrated to a methane concentration of about 50 wt %, but not only is there a high risk of the methane concentration entering the explosive concentration range but there is also the problem of the methane concentration of the gas fluctuating after concentration when there is fluctuation of the methane concentration of the raw gas.

Therefore, the methane concentration system is provided with a concentration setting means 26 for adjusting the feeding rate of the high-concentration gas CG to the mixer 2 and setting the methane concentration of the product gas PG generated by the mixer 2 to or above 30 wt % or another allowed concentration. The concentration setting means 26 will be described in detail below.

A methane concentration sensor 21 for detecting the methane concentration of the product gas PG generated by the mixer 2 is provided to the duct 4 on the downstream side of the mixer 2. An adjustment valve 25 capable of adjusting the feeding rate of high-concentration gas CG to the mixer 2 is also provided to the duct 9 on the upstream side of the mixer 2.

Furthermore, a computer to which the detection results of the methane concentration sensor 21 are inputted, and that is capable of controlling the degree of opening of the adjustment valve 25 is configured so as to function as the concentration setting means 26 for controlling the feeding rate of the high-concentration gas CG on the basis of the methane concentration of the product gas PG by executing a predetermined program.

When the methane concentration of the product gas PG detected by the methane concentration sensor 21 is less than the allowed concentration, the concentration setting means 26 increases the degree of opening of the adjustment valve 25 and increases the feeding rate of the high-concentration gas CG to the mixer 2, and the methane concentration of the same product gas PG can thereby be increased. On the other hand, when the methane concentration of the product gas PG detected by the methane concentration sensor 21 is equal to or higher than the upper limit concentration that is significantly higher than the allowed concentration, the concentration setting means 26 reduces the degree of opening of the adjustment valve 25 and reduces the feeding rate of the high-concentration gas CG to the mixer 2, and the methane concentration of the same product gas PG can thereby be decreased.

Even when there is fluctuation in the methane concentration or feeding rate of the raw gas IG fed to the mixer 2, the methane concentration of the product gas PG generated by the mixer 2 is stable and equal to or above the allowed concentration. Since a product gas PG can be manufactured in which the concentration is always constant, stable operation of the gas utilizing equipment can be maintained.

Figure 2:
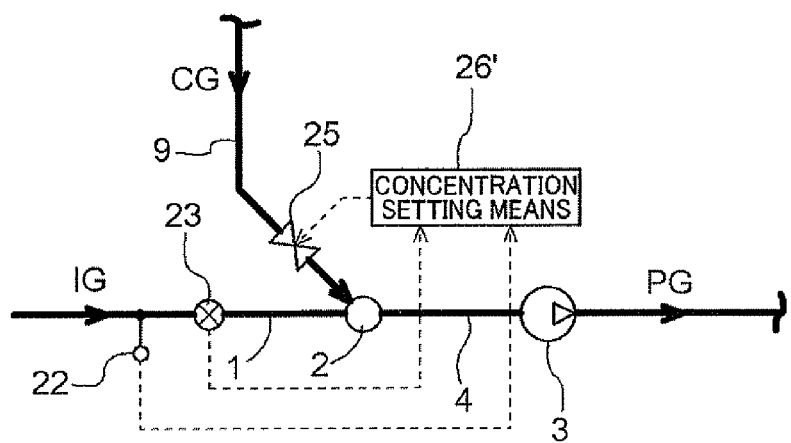
FIG. 2 is a partial view showing another embodiment of the concentration setting means.

The concentration setting means 26 may also be appropriately modified, such as in the concentration setting means 26' shown in FIG. 2.

Specifically, in FIG. 2, a methane concentration sensor 22 for detecting the methane concentration of the raw gas IG fed to the mixer 2, and a flow rate sensor 23 for detecting the feeding rate of the raw gas IG to the mixer 2 are provided to the duct 1 on the upstream side of the mixer 2.

Furthermore, a computer to which the detection results of the methane concentration sensor 22 and the flow rate sensor 23 are inputted, and that is capable of controlling the degree of opening of the adjustment valve 25 is configured so as to function as the concentration setting means 26' for controlling the feeding rate of the high-concentration gas CG on the basis of the methane concentration and feeding rate of the raw gas IG by executing a predetermined program.

The concentration setting means 26' is configured so as to calculate the feeding rate at which the high-concentration gas CG should be fed to the mixer 2 so that the methane concentration of the product gas PG generated in the mixer 2 is stable and equal to or above the allowed concentration based on the methane concentration of the raw gas IG detected by the methane concentration sensor 22, and the feeding rate of the raw gas IG detected by the flow rate sensor 23, and is configured to adjust the degree of opening of the adjustment valve 25 so that the actual feeding rate at which the high-concentration gas CG is fed to the mixer 2 is the determined feeding rate.

Figure 3:
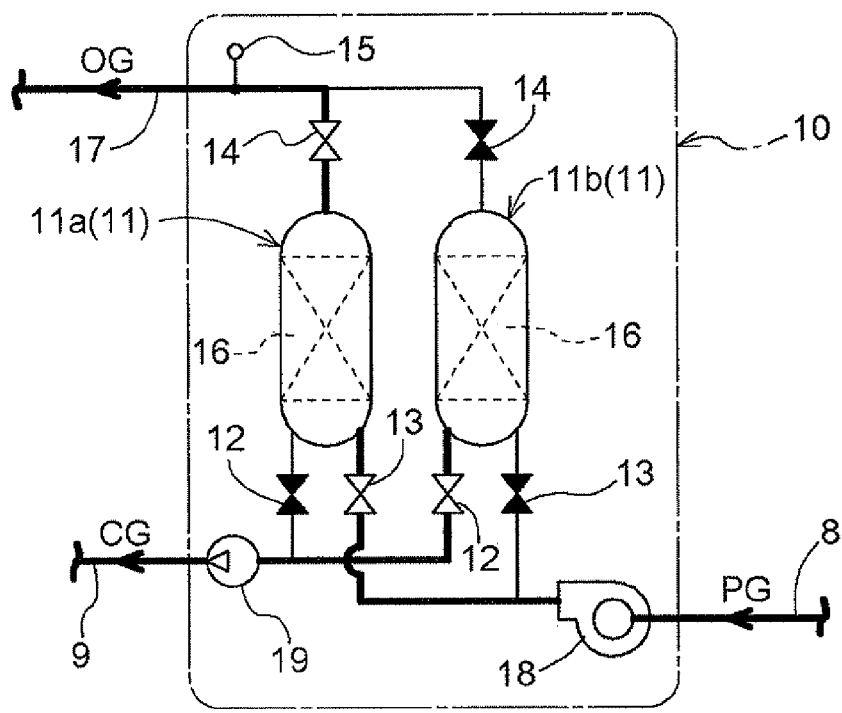
FIG. 3 is a schematic sectional view showing a processing state of the concentration device.
Figure 3:
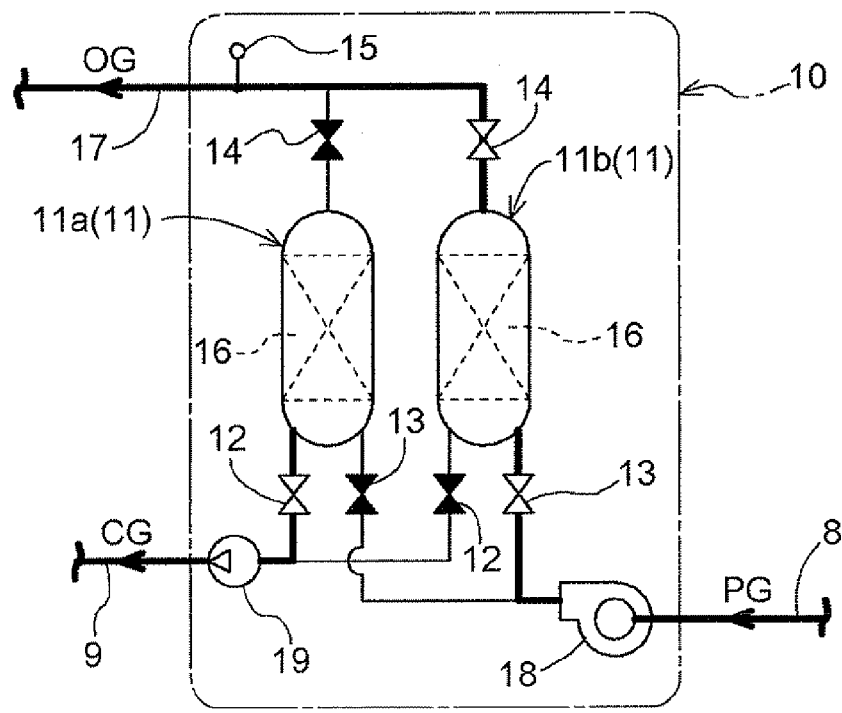

Any known configuration may be employed as the configuration of the concentrating apparatus 10, but the adsorption-type concentrating apparatus described hereinafter may be employed in order to enhance safety and efficiency. The detailed structure of the concentrating apparatus 10 will be described based on FIG. 3.

The concentrating apparatus 10 is provided with adsorption towers 11 filled with an adsorbent 16 for preferentially adsorbing methane, as well as opening and closing valves 12, 13, 14, a blower 18, and a suction pump 19 or the like. Using a control apparatus or the like (not shown) for controlling these components, and introducing an arrangement of the components (which will be described below), the opening and closing valves are operated so as to alternately execute adsorption processing in which the product gas PG is passed through the adsorption towers 11, for example at about atmospheric pressure, and desorption processing in which a high-concentration gas CG is expelled from the adsorption towers 11 at a pressure lower than the pressure during the adsorption processing.

The concentrating apparatus 10 described in the present embodiment is an embodiment in which two adsorption towers 11 (first adsorption tower 11a, second adsorption tower 11b) both having the same structure are provided in parallel, and a detailed description will be given hereinafter, but while the adsorption processing is being executed in one adsorption tower 11, the desorption processing is being executed in the other adsorption tower 11. The concentrating apparatus 10 is also configured so that the adsorption processing and the desorption processing are executed in alternating fashion in the two adsorption towers.

The adsorbent 16 filled into the adsorption towers 11 is not particularly limited insofar as the adsorbent is a methane adsorbent that adsorbs methane with priority, and it is preferred that a methane adsorbent be used that is at least one adsorbent selected from the group that includes active carbon, zeolite, silica gel, and an organic metal complex (copper fumarate, copper terephthalate, copper cyclohexane dicarboxylate, and the like) having an average micropore diameter of 4.5 to 15 Å as measured by the MP method, and a methane gas adsorption of 20 Ncc/g or higher at atmospheric pressure and 298 K. The abovementioned average micropore diameter is preferably 4.5 to 10 Å, and more preferably 5 to 9.5 Å, and the abovementioned methane adsorption is preferably 25 Ncc/g or higher. Such an active carbon is obtained by forming a carbonaceous material in which a carbon compound obtained by completely carbonizing palm husk or palm husk carbon in nitrogen gas at 600° C. is ground into grains having a diameter of 1 to 3 mm is activated at 860° C. in an atmosphere that includes 10 to 15 vol % of water vapor, 15 to 20 vol % of carbon dioxide, and nitrogen as the remainder using a batch-style flow activation oven having an inner diameter of 50 mm, for example.

Through the use of a methane adsorbent capable of adsorbing methane gas with priority at atmospheric pressure and 298 K as the adsorbent 16, methane gas can be adequately adsorbed to the adsorbent 16 even in conditions of atmospheric pressure and 298 K.

Specifically, when the methane adsorption in the adsorbent 16 at atmospheric pressure and 298 K is less than 20 Ncc/g, the methane adsorption performance at low pressure (particularly at about atmospheric pressure) is reduced, the methane concentration of the post-concentration high-concentration gas CG is reduced, and the quantity of the adsorbent 16 must be increased and the size of the device increased in order to maintain the adsorption performance. The upper limit of the abovementioned methane adsorption is not particularly limited, but the methane adsorption currently obtained in the methane adsorbent is about 40 Ncc/g or lower.

When the average micropore diameter in the adsorbent 16 as measured by the MP method is smaller than 4.5 Å, the adsorption of oxygen gas and nitrogen gas increases, the methane concentration in the post-concentration high-concentration gas CG is reduced, the average micropore diameter approaches the methane molecular diameter, the adsorption rate decreases, the methane adsorption performance is reduced, and adsorption becomes impossible. On the other hand, when the average micropore diameter in the adsorbent 16 as measured by the MP method is greater than 15 Å, the methane adsorption performance at low pressure (particularly at about atmospheric pressure) is reduced, the methane concentration of the post-concentration high-concentration gas CG is reduced, and the quantity of the adsorbent 16 must be increased and the size of the device increased in order to maintain the adsorption performance.

Furthermore, the volume of micropores having an average micropore diameter of 10 Å or less as measured by the HK method may be 50% or more, preferably 70% or more, and more preferably 80% or more of the total micropore volume in the adsorbent 16. In this case, since the volume of micropores having an average micropore diameter of 10 Å or less that are capable of adsorbing methane gas with priority accounts for 50% or more of the total micropore volume, the amount of methane that can be adsorbed at atmospheric pressure (about 0.1 MPa) is increased, and methane can be adequately adsorbed even at atmospheric pressure.

The nitrogen adsorption of the adsorbent 16 at a relative pressure ratio of 0.013 that corresponds to an average micropore diameter of 10 Å as measured by the HK method in the nitrogen adsorption at 77 K may be 50% or more, preferably 70% or more, and more preferably 80% or more of the nitrogen adsorption at a relative pressure ratio of 0.99 that corresponds to the total micropore volume. The term "relative pressure ratio" refers to the pressure ratio with respect to the saturation vapor pressure at the measurement temperature. In this case, the adsorption at a relative pressure ratio of 0.99 represents the total micropore volume, and the adsorption at a relative pressure ratio of 0.013 represents the volume of micropores having an average micropore diameter of 10 Å or less, and the ratio of these values indicates that the ratio of micropores having an average micropore diameter of 10 Å or less is higher, in the same manner as described above. As a result, methane near atmospheric pressure can be easily and efficiently concentrated even when concentrating a product gas PG in which methane and air are mixed.

The concentrating apparatus 10 is configured so that the product gas PG is acquired via the blower 18 from the duct 8, and high-concentration gas CG is expelled to the duct 9 via the suction pump 19.

Furthermore, the lower sides of the insides of the adsorption towers 11 are connected to the exit side of the previously described blower 18 via opening and closing valves 13, and are connected to the entry side of the previously described suction pump 19 via opening and closing valves 12. The upper sides of the insides of the adsorption towers 11 are connected to a duct 17 that is opened to the atmospheric pressure via opening and closing valves 14.

The blower 18 may be omitted as appropriate when the feeding pressure of the product gas PG from the gas tank 5 to the duct 8 is adequately high. The suction pump 19 may also be omitted as appropriate when the suction force of the high-concentration gas CG in the duct 9 is adequately high.

When the adsorption processing is executed, as indicated by the state of the first adsorption tower 11a shown in FIG. 3A and the state of the second adsorption tower 11b shown in FIG. 3B, the opening and closing valves 12 are closed, and the opening and closing valves 13 and 14 are opened, and the product gas PG at about atmospheric pressure is passed through the inside of the adsorption towers 11 such that the product gas PG is taken into the adsorption towers 11 from the duct 8 via the blower 18, and the exhaust gas that has passed through the adsorption towers 11 is discharged to the duct 17 from inside the adsorption towers 11. Specifically, in the adsorption processing, the methane included in the product gas PG is adsorbed to the adsorbent 16, and the exhaust gas not adsorbed to the adsorbent 16 is discharged to the duct 17.

The exhaust gas OG discharged to the duct 17 may be discharged to the atmosphere, but because a small amount of methane may be included therein, the exhaust gas is preferably discharged to the atmosphere after performing dilution processing using a ventilation device, or other appropriate processing.

In the desorption processing executed after the adsorption processing is executed, as indicated by the state of the second adsorption tower 11b shown in FIG. 3A and the state of the first adsorption tower 11a shown in FIG. 3B, the opening and closing valves 12 are opened, the opening and closing valves 13 and 14 are closed, and the suction force of the suction pump 19 is transmitted to the inside of the adsorption towers 11, whereby the pressure inside the adsorption towers 11 is reduced lower than the pressure during the adsorption processing. Since desorption of methane from the adsorbent 16 is accelerated in the adsorption towers 11 thus depressurized, gas including a large amount of methane, in which the methane concentration is higher than the product gas PG, is expelled as high-concentration gas CG to the duct 9 via the suction pump 19.

As shown in FIG. 3A, the concentrating apparatus 10 is configured so as to execute the adsorption processing and the desorption processing in alternating fashion between the adsorption towers 11, in a configuration in which the concentrating apparatus 10 switches between a first state in which the desorption processing is executed in the second adsorption tower 11b while the adsorption processing is executed in the first adsorption tower 11a, and a second state in which the adsorption processing is executed in the second adsorption tower 11b while the desorption processing is executed in the first adsorption tower 11a. This configuration makes it possible to continuously expel the high-concentration gas CG to the duct 9.

The switch between the first state and the second state described above may be performed at a regular time interval, for example, but a configuration is preferably adopted in which a methane concentration sensor 15 for detecting the methane concentration of the exhaust gas OG is provided to the duct 17, and when the methane concentration exceeds a set concentration, the methane adsorption performance of the adsorbent 16 in the adsorption tower 11 executing the adsorption processing is considered to have reached the limit, and a switch is performed between the first state and the second state.

When an adsorption-type concentrating apparatus 10 such as the one described above is used, the moisture in the product gas PG fed into the adsorption towers 11 is preferably removed in advance in order to minimize reduction of the adsorption performance of the adsorbent 16 due to moisture.

In the present methane concentration system, a configuration is adopted in which raw gas IG having a low methane concentration is subjected to disposal or the like after dilution processing and appropriately processed even when the high-concentration gas CG is unable to be generated due to failure or the like of the concentrating apparatus 10.

Specifically, as shown in FIG. 1, a duct 29 that leads to gas processing equipment 30 for disposing of gas after dilution processing is connected to the duct 4, an opening and closing valve 27 is provided further downstream than the connecting part of the duct 4, and an opening and closing valve 27 is provided to the duct 29.

When the concentrating apparatus 10 is capable of normally generating the high-concentration gas CG, the opening and closing valve 27 is opened, and the opening and closing valve 28 is closed, and the product gas PG generated in the mixer 2 can be fed through the duct 4 to the gas tank 5.

When the concentrating apparatus 10 is unable to normally generate the high-concentration gas CG, the opening and closing valve 27 is closed, the opening and closing valve 28 is opened, and the low-concentration raw gas IG passed through the mixer 2 can be fed through the duct 29 to the gas processing equipment 30 and there subjected to disposal processing.

[Other Embodiments]

(1) In the embodiment described above, coal mine gas was used as the raw gas IG, and methane was used as the flammable gas, but the raw gas is not particularly limited insofar as a flammable gas is included therein, and the flammable gas is not particularly limited insofar as the flammable gas is a gas that is flammable. The configuration of the concentrating apparatus as the concentrating means, e.g., the type of adsorbent, may be appropriately modified according to the type of flammable gas.

(2) In the embodiment described above, a concentrating means for acquiring at least a portion of the product gas PG, concentrating the flammable gas included in the acquired product gas PG, and generating the high-concentration gas CG was configured as an adsorption-type concentrating apparatus 10 that uses an adsorbent 16, but a different type of concentrating apparatus may, of course, be used.

The internal pressure of the adsorption towers in the adsorption processing and the desorption processing may also be appropriately modified even when an adsorption-type concentrating apparatus is used, and when the pressure inside the adsorption towers is set to about atmospheric pressure in the desorption processing, and the high-concentration gas is expelled from the inside of the adsorption towers, for example, the product gas may be introduced into the adsorption towers at a pressure higher than atmospheric pressure in the adsorption processing.

(3) In the embodiment described above, a gas tank 5 was provided as the storage unit for storing the product gas, and the concentrating apparatus 10 as the concentrating means was configured so as to acquire the product gas PG from the gas tank 5, but a configuration may be adopted in which the concentrating means directly acquires at least a portion of the product gas generated by the mixing means, or an appropriate modification may be made so that there is no storage unit, and the product gas is directly fed to the gas utilizing equipment.

(4) In the embodiment described above, the suction pump 3 was provided as a suction means for drawing the product gas PG in from the mixer 2 on the downstream side of the mixer 2 as the mixing means, but separate pumps for feeding the raw gas and the high-concentration gas to the mixing means may also be provided instead of the suction pump.

INDUSTRIAL APPLICABILITY

The flammable gas concentration system of the present invention can be effectively utilized as a flammable gas concentration system capable of safely generating a product gas that can be effectively utilized as a fuel in which the flammable gas is concentrated, even from a gas in which the flammable gas concentration is within a low concentration range of less than 30 wt %, for example, such as coal mine gas that includes the flammable gas methane.

The invention claimed is:

1. A flammable gas concentration system for generating a product gas in which a flammable gas is concentrated from a raw gas that includes the flammable gas; said flammable gas concentration system comprising:
concentrating means for acquiring at least a portion of said product gas, concentrating the flammable gas included in the acquired product gas, and generating a high-concentration gas;
mixing means for acquiring said raw gas and the high-concentration gas generated by said concentrating means, mixing the acquired high-concentration gas and the raw gas, and generating said product gas; and
concentration setting means for adjusting a feeding rate of said high-concentration gas to said mixing means and setting a flammable gas concentration of said product gas generated by said mixing means to or above an allowed concentration.

2. The flammable gas concentration system according to claim 1, wherein said concentrating means comprises an adsorption tower filled by an adsorbent for selectively adsorbing said flammable gas, and is configured so as to alternately execute adsorption processing for causing said product gas to pass through an inside of said adsorption tower, and desorption processing for expelling said high-concentration gas from the inside of said adsorption tower at a pressure lower than a pressure during said adsorption processing.

3. The flammable gas concentration system according to claim 2, wherein said flammable gas is methane.

4. The flammable gas concentration system according to claim 2, wherein a storage unit is provided for storing said product gas, and said concentrating means is configured so as to acquire said product gas from said storage unit.

5. The flammable gas concentration system according to claim 2, comprising suction means for drawing in said product gas from the mixing means, the suction means being provided on a downstream side of said mixing means.

6. The flammable gas concentration system according to claim 1, wherein said flammable gas is methane.

7. The flammable gas concentration system according to claim 6, wherein a storage unit is provided for storing said product gas, and said concentrating means is configured so as to acquire said product gas from said storage unit.

8. The flammable gas concentration system according to claim 6, comprising suction means for drawing in said product gas from the mixing means, the suction means being provided on a downstream side of said mixing means.

9. The flammable gas concentration system according to claim 1, wherein a storage unit is provided for storing said product gas, and said concentrating means is configured so as to acquire said product gas from said storage unit.

10. The flammable gas concentration system according to claim 9, comprising suction means for drawing in said product gas from the mixing means, the suction means being provided on a downstream side of said mixing means.

11. The flammable gas concentration system according to claim 1, comprising suction means for drawing in said product gas from the mixing means, the suction means being provided on a downstream side of said mixing means.

* * * * *